United States Patent [19]

Hepp

[11] 4,393,153

[45] Jul. 12, 1983

[54] IMPACT MODIFIED GLASS/MINERAL REINFORCED POLYESTER BLENDS

[75] Inventor: Leonard R. Hepp, Evansville, Ind.

[73] Assignee: General Electric Company, Pittsfield, Mass.

[21] Appl. No.: 316,947

[22] Filed: Oct. 30, 1981

[51] Int. Cl.$^3$ .................... C08L 25/10; C08L 67/02
[52] U.S. Cl. .................................. 523/201; 524/449; 524/513
[58] Field of Search ............... 523/201; 524/449, 539, 524/513

[56] References Cited

U.S. PATENT DOCUMENTS

| | | | |
|---|---|---|---|
| 2,465,319 | 3/1949 | Whinfield et al. | 526/71 |
| 3,833,685 | 9/1974 | Wambach | 524/409 |
| 3,953,394 | 4/1976 | Fox et al. | 524/86 |
| 4,034,013 | 7/1977 | Lane | 524/513 |
| 4,096,202 | 6/1978 | Farnham et al. | 525/64 |
| 4,180,494 | 12/1979 | Fromuth et al. | 523/201 |
| 4,280,949 | 7/1981 | Dieck | 524/449 |

FOREIGN PATENT DOCUMENTS

| | | |
|---|---|---|
| 2931430 | 7/1980 | Fed. Rep. of Germany . |
| 3004942 | 8/1980 | Fed. Rep. of Germany . |

*Primary Examiner*—Lewis T. Jacobs
*Attorney, Agent, or Firm*—Hedman, Casella, Gibson, Costigan & Hoare

[57] ABSTRACT

The addition of poly(ethylene terephthalate) to core-shell resin impact modified, glass fiber and mica reinforced poly(1,4-butylene terephthalate) compositions provides articles molded therefrom with improved surface gloss, impact strength, flexural modulus, flexural strength and tensile strength. Heat distortion temperatures are elevated if not less than 2.6 nor more than 4 parts by weight of poly(1,4-butylene terephthalate) resin is present for each 1 part by weight of acrylic resin impact modifier.

10 Claims, No Drawings

IMPACT MODIFIED GLASS/MINERAL REINFORCED POLYESTER BLENDS

The present invention relates to polymeric resin molding compositions. More particularly, it relates to impact modified, glass/mineral-reinforced polyester resin molding compositions with improved surface appearance and elevated resistance to deflection under load at high temperatures.

BACKGROUND OF THE INVENTION

It has been found that substitution of up to 20 percent by weight of poly(ethylene terephthalate) (PET) for poly(1,4-butylene terephthalate) (PBT) in glass fiber reinforced, optionally impact modified, molding compositions improves the surface gloss of articles molded therefrom. Such compositions are described and claimed in Fox and Wambach, U.S. Pat. No. 3,953,394. Such a substitution, however, has a tendency to reduce notched Izod impact strength, flexural modulus, flexural strength and tensile strength. As a result, such glass reinforced PET/PBT blends find most advantageous use when improved surface gloss outweighs the reduction in physical properties. It has also been found that compositions with high heat distortion temperatures and resistance to warping during removal from the mold can be produced by reinforcing impact modified PBT with a combination of glass fiber and mica. Such compositions, which tend to have low surface gloss, are described and claimed in copending Liberti application, Ser. No. 925,992, filed July 19, 1978, now abandoned. German Offenlegungsschrift No. 2,931,430, July 31, 1980, based on U.S. Ser. No. 4,596, filed Jan. 18, 1979, now abandoned, describes PBT molding compositions, containing PET, impact modified with an acrylic resin and reinforced with glass fiber and mica. Such compositions are disclosed to have high impact strength and stiffness. The ratio of PBT to impact modifier is below 2:1, and the amount of PBT used with respect to PET is generally equal to or lower than 3:2. In addition, the ratio of combined polyesters to combined reinforcement is generally below 5:4, e.g., 4.5:4.

It has now been discovered that the addition of PET to the impact modified glass fiber and mica reinforced PBT compounds not only improves surface gloss but also it improves notched Izod impact strength, flexural modulus, flexural strength and tensile strength. Surprisingly, if the amount of impact modifier is controlled, based on the PBT content, to not less than 3 nor more than 4 parts by weight of PBT per part by weight of impact modifier, then very beneficial effects on heat distortion resistance can be obtained. Such a modification and the advantageous effects are nowhere suggested by the above-mentioned German Offenlegungsschrift. The above-mentioned patents, application and publication are incorporated herein by reference.

DESCRIPTION OF THE INVENTION

According to the present invention, in a thermoplastic composition comprising:

(a) a polyester composition comprising:

(i) a major proportion of a poly(1,4-butylene terephthalate) resin or a copolyester thereof with a minor amount of an aliphatic or aromatic dicarboxylic acid or an aliphatic polyol and (ii) a minor proportion of a poly(ethylene terephthalate resin);

(b) an impact improving amount of a core shell resin having a rubbery core surrounded by a grafted acrylic shell; and (c) an effective reinforcing amount of a combination comprising approximately equal weights of mica and glass fibers, there is provided the improvement which comprises providing not substantially less than about 2.6 and not substantially more than about 4 parts by weight of poly(1,4-butylene terephthalate) resin component (a) (i) per 1 part by weight of said impact improving core shell resin component (b).

As will be shown hereinafter, the heat distortion temperature (Deflection Temperature Under Load, DTUL, ASTM D648) at 264 psi is elevated from 352° F. with a PBT/core shell resin impact modifier weight ratio of 2:1 according to the prior art to 394° F. with a PBT/core-shell resin modifier ratio of about 3:1 according to the present discovery. Other properties, especially stiffness properties are also improved, and melt viscosity, which is of key importance in molding, is drastically reduced.

The poly(1,4-butylene terephthalate) resin will be of high molecular weight. The polyester units can include a minor amount, e.g., from 0.5 to 2% by weight, of units derived from aliphatic or aromatic dicarboxylic acids and/or aliphatic polyols, e.g., glycols, i.e., copolyesters. The poly(ethylene terephthalate) resin component is disclosed in Whinfield et al., U.S. Pat. No. 2,465,319. Such polyesters will have molecular weights high enough to be film- and fiber-formers. All such polyesters can be made following the teachings of the above-mentioned patents, and both poly(ethylene terephthalate) and poly(1,4-butylene terephthalate) are commercially available from a number of sources.

Illustratively, sufficiently high molecular weight poly(ethylene terephthalate) resins will have an intrinsic viscosity of at least 0.2 and preferably at least about 0.4 deciliters/gram as measured in o-chlorophenol, a 60/40 phenol tetrachloroethane mixture or a similar solvent at 25°–30° C. The poly(1,4-butylene terephthalate) resins will have intrinsic viscosities of at least 0.6 and more preferably 0.8 dl./g., same basis. The upper limit is not critical, but it will generally be about 1.5 dl./g. Especially preferred poly(ethylene terephthalates) will have an intrinsic viscosity in the range 0.5–1.0; and preferred poly(1,4-butylene terephthalate) resins will be in the range of 0.9–1.2 dl./g.

Although poly(ethylene terephthalate) and poly(1,4-butylene terephthalate) are known from the Fox and Wambach patent above-mentioned, to be combinable with each other in all proportions, for the purpose of the present invention, a major proportion, e.g., 51 parts by weight up to 99 parts by weight of PBT will be present for correspondingly from 49 to 1 part of PET as the minor proportion component. In general, however, compositions containing about 2 to 4 parts by weight of PBT per 2 parts by weight of PET will be preferred, and those containing about 3 parts by weight of PBT per 2 parts by weight of PET will be especially preferred.

The compositions include a reinforcing filler combination of glass fibers, preferably ⅛ in. chopped glass fiber, and mica, preferably phlogopite mica. Like the Liberti application disclosure, and the German Offen. mentioned above, fibrous glass and mica will be used in approximately equal weights, although it is permissible to vary somewhat, e.g., in the range of from 40 to 60 parts by weight of glass for, correspondingly, 60 to 40 parts by weight of mica.

The amount of reinforcing agent combination present can vary somewhat too, although a preference can be stated for about 40 parts by weight for each 100 parts by weight of resin, impact modifier and reinforcement, combined. It is to be understood, however, that some latitude is permissible here, too, e.g., within a range of from about 35 to about 45 parts by weight of reinforcing combination per 100 parts of total composition, by weight. The best properties seem to be exhibited in compositions comprising a weight ratio of polyester component (a) to reinforcing combination (c) of about 5:4.

Impact modifier (b) comprises a core shell resin of the type generally used with such polyester resins. These are commercially available, one especially preferred being Acryloid KM 330, another being Acryloid KM 653, and a third being Acryloid KM 323B, all sold by Rohm & Haas, Phila., Pa., U.S.A. Suitable such acrylic impact modifiers are also described with methods for their preparation in many cases, in Fromuth et al., U.S. Pat. No. 4,180,494; Farnham et al., U.S. Pat. No. 4,096,202; and Lane, U.S. Pat. No. 4,034,013; all of which are incorporated herein by reference.

A suitable core shell polymer comprises a two stage interpolymer, the first stage comprising about 60 to 95% by weight of the interpolymer and being polymerized from a monomer system comprising 95 to 99.8 wt. % of butyl acrylate, 0.1 to 2.5 wt. % of allyl methacrylate or diallyl maleate, and the outer stage comprising methyl methacrylate, about 60 to 100% by weight (U.S. Pat. No. 4,096,202).

Another suitable core shell polymer comprises a core polymerized from a monomer system comprising a diene monomer, e.g., of butadiene or isoprene, styrene, methyl methacrylate and divinyl benzene, an intermediate stage polymerized from styrene, and a shell polymerized from methyl methacrylate and 1,3-butylene glycol dimethacrylate.

It is critical to the present invention that not less than about 2.6 parts by weight of PBT be used per 1 part by weight of acrylic impact modifier. Otherwise, the DTUL (deflection temperature under load) will be reduced. The upper limit of this ratio is somewhat less critical, but no advantageous results are expected if more than about 4 parts by weight of PBT are used for each 1 part by weight of acrylic impact modifier.

The most preferred composition in terms of amounts appears to comprise per 100 parts by weight:

(a) a polyester composition comprising:
(i) about 30 parts by weight of poly(1,4-butylene terephthalate) resin;
(ii) about 20 parts by weight of poly(ethylene terephthalate) resin;

(b) about 10 parts by weight of an impact improving core shell resin having a rubbery core surrounded by a grafted acrylic shell; and (c) a combination comprising about 20 parts by weight of reinforcing mica and about 20 parts by weight of reinforcing glass.

The reinforced impact modified polyester combination can be rendered flame retardant with an effective amount of a conventional flame retardant agent. As is well known, flame retardants can be based on elementary red phosphorus compounds, halogen compounds and nitrogen compounds alone or preferably in further combination with synergists, such as antimony compounds. Especially useful are brominated diphenyl ethers and polymeric and oligomeric flame retardant agents comprising tetrabromobisphenol-A carbonate units, see, for example Wambach, U.S. Pat. No. 3,933,685, incorporated herein by reference.

Other ingredients, such as dyes, pigments, drip retardants, and the like can be added for their conventionally employed purposes.

The compositions of the invention can be prepared by a number of procedures. In one way, the impact modifier and the reinforcement is put into an extrusion compounder with the resinous components to produce molding pellets. The modifier and reinforcement is dispersed in a matrix of the resin in the process. In another procedure, the modifier is mixed with the resins and the reinforcements by dry blending then either fluxed on a mill and comminuted, or they are extruded and chopped.

The compositions can be molded in any equipment conventionally used for glass/mineral-filled thermoplastic compositions, e.g., a Van Dorn type injection molding machine with conventional cylinder temperatures, e.g., 450°–525° F. and conventional mold temperatures, e.g., 140°–160° F.

DESCRIPTION OF THE PREFERRED EMBODIMENTS

The following examples illustrate the invention. They are set forth as a further description but are not to be construed as limiting the invention thereto.

EXAMPLE 1

Dry blends of poly(1,4-butylene terephthalate) resin, poly(ethylene terephthalate) resin, core-shell resin impact modifier, glass, mica and mold release/stabilizer are compounded and extruded at 540° F. in an extruder. The extrudate is pelletized and injection molded at 490° F. (mold temperature 150° F.). A control is analyzed and run for comparison purposes. The samples for warpage test comprise 1/16″×4″ circular discs, edge gated, injection molded at 200° F. Shrinkage is measured on an ⅛″×4″ circular disc, in the machine direction (first value), and in the transverse direction (second value). The formulations and physical properties are shown in Table 1:

TABLE 1

Compositions Comprising Polyesters, Impact Modified and Reinforced with Glass/Mica

| Example | 1 | A* |
|---|---|---|
| Composition (parts by weight) | | |
| Poly(1,4-butylene terephthalate)$^a$ | 29.85 | (26.5) |
| Poly(ethylene terephthalate)$^b$ | 20.0 | (20.2) |
| Core-shell impact modifier$^c$ | 10.0 | (13.3) |
| Glass fibers$^d$ | 20.0 | (20.0) |
| Mica$^e$ | 20.0 | (20.0) |
| Mold release/stabilizers (to make 100) | | |
| Properties | | |
| Heat Distortion (DTUL) 264 psi °F. | 394 | 352 |
| Warpage, R.T., mm. | 0 | 2 |
| annealed a 350° F. for 30 min., mm. | 5.0 | 12.3 |
| Notched Izod Impact, ft.lbs./in. | 1.6 | 1.8 |
| Unnotched Izod Impact, ft.lbs./in. | 8.7 | 10.2 |
| Flexural Strength, psi | 22,200 | 19,600 |
| Flexural Modulus, psi | 1,172,000 | 1,100,000 |
| Tensile strength, psi | 13,120 | 11,400 |
| Spiral flow (in./600 psi) | 6.15 | 5.6 |
| Melt viscosity, pellet-poise (510° F.) | 16,780 | 39,886 |
| Specific Gravity | 1.613 | 1.607 |

TABLE 1-continued

Compositions Comprising Polyesters, Impact Modified and Reinforced with Glass/Mica

| Example | 1 | A* |
|---|---|---|
| Shrink, mils./in. | 5.1–5.9 | 5–6 |

*Control (by analysis GAF Corp. 7443R; See also Germ Offen. 2,931,430, Jan. 18, 1980)
[a] Intrinsic viscosity, 0.85 dl./g., measured at 30° C. in 60/40 w/w phenol-tetrachloroethane
[b] Goodyear Vituf 5900A
[c] Rohm & Haas Acryloid KM330, rubbery acrylic core, thermoplastic acrylic shell
[d] ⅛" chopped strand
[e] Suzorite 150S The excellent resistance to heat distortion and the generally improved properties, as well as easier mold flow, provided by the present invention are seen in comparing Example 1 which uses about 3 parts of PBT per 1 part of core-shell modifier with comparative Example A*, which uses about 2 parts of PBT per 1 part of core-shell modifier.

To provide more data on a possible upper limit in the ratio of PBT to core-shell modifier, the formulation of Example 1 is modified by replacing one half of the core-shell modifier with an equal weight of a non-core-shell impact modifier (Hytrel resin-DuPont a copolyester of butylene oxide and butanediol with terephthalic acid). This produces a composition with about 6 parts by weight of PBT per 1 part by weight of core-shell modifier and, while generally excellent physical properties were retained, the heat distortion temperature was lower, 383 F., instead of 394 F. for Example 1.

EXAMPLES 2-3

Compositions are prepared, molded and tested by the general procedures set forth above. The formulations and physical properties are shown in Table 2:

TABLE 2

Polyester Compositions Impact Modified and Reinforced

| Example | 2 | 3 |
|---|---|---|
| Composition (parts by weight) | | |
| Poly(1,4-butylene terephthalate) | 27.3 | 26.5 |
| Poly(ethylene terephthalate) | 20.0 | 15 |
| Core-shell impact modifier[b] [i] | 10 | — |
| Core-shell impact modifier[b] [ii] | — | 10 |
| Glass fibers | 20 | 20 |
| Mica | 20 | 20 |
| Flame retardant additive[d] | — | 8.5 |
| Mold release/stabilizer combination[e] [i] | — | 0.7 |
| Stabilizer combination[e] [ii] | 2.0 | — |
| Properties | | |
| Distortion Temperature at 264 psi, °F. | — | 372 |
| Warpage, room temperature, mm. | — | 1.0 |
| annealed at 350° F., 30 min., mm. | — | 6.7 |
| Notched Izod impact, ft.lbs./in. | 1.6 | 1.5 |
| Unnotched Izod impact, ft.lbs./in. | 8.2 | 7.8 |
| Flexural strength ($10^3$ psi) | 17.3 | 20.8 |
| Flexural modulus ($10^3$ psi) | 107.7 | 120.1 |
| Tensile strength ($10^3$ psi) | 10.2 | 12.8 |
| Flammability, UL Bull. 94 | — | V-O |

[b] [i] Acryloid KM 653, Rohm & Haas, butadiene core, acrylate shell
[b] [ii] Acryloid KM 330, Rohm & Haas, acrylate core, acrylate shell
[d] decabromodiphenyl ether 4.5; antimony oxide 4.0 (pbw)
[e] [i] PE-18, pentaerythritol tetrastearate 0.2; Naugard P, 0.5 (pbw)
[e] [ii] Seenox 4125, 1.33; Topanol CA, .33; Naugard 445, 0.33 (pbw)

Example 2 provides excellent workpieces using a core-shell polymer having a polymerized diene rubbery core. Example 3 provides excellent workpieces with flame retardant properties, the impact modifier having a polymerized acrylate monomer rubbery core.

From the foregoing it is seen that the present invention provides compositions with many advantages over those exhibited by the prior art, including samples available from commercial sources in addition to assignee herein.

Obviously, other modifications and variations of the present invention are possible in the light of the above teachings. It is, therefore, to be understood that changes may be made in the particular embodiments described which are within the scope of the invention as defined in the appended claims.

I claim:
1. In a thermoplastic composition comprising
   (a) a polyester composition comprising:
      (i) a major proportion of a poly(1,4-butylene terephthalate)resin or a copolyester thereof with a minor amount of an aliphatic or aromatic dicarboxylic acid or an aliphatic polyol and
      (ii) a minor proportion of a poly(ethylene terephthalate resin);
   (b) an impact improving amount of a core-shell resin having a rubbery core surrounded by a grafted acrylic shell; and
   (c) an effective reinforcing amount of a combination comprising approximately equal weights of mica and glass fibers, the improvement which comprises providing not substantially less than about 2.6 and not substantially more than about 4 parts by weight of poly(1,4-butylene terephthalate) resin component (a) (i) per 1 part by weight of said impact improving acrylic resin component (b).

2. A composition as defined in claim 1 which comprises about 3 parts by weight of poly(1,4-butylene terephthalate) component (a) (i) per 1 part by weight of impact improving core-shell resin component (b).

3. A composition as defined in claim 1 comprising about 3 parts by weight of poly(1,4-butylene terephthalate) resin component (a) (i) per 2 parts by weight of poly(ethylene terephthalate) resin component (a) (ii).

4. A composition as defined in claim 1 comprising about 5 parts by weight of polyester composition (a) per 4 parts by weight of reinforcing combination (c).

5. A composition as defined in claim 1 wherein said core shell resin comprises a rubbery core of polymerized acrylate monomer and an outer shell of polymerized acrylate monomer.

6. A composition as defined in claim 1 wherein said core shell resin comprises a rubbery core of polymerized diene monomer and an outer shell of polymerized acrylate monomer.

7. A thermoplastic composition comprising per 100 parts by weight
   (a) a polyester composition comprising:
      (i) about 30 parts by weight of poly(1,4-butylene terephthalate) resin;
      (ii) about 20 parts by weight of poly(ethylene terephthalate) resin;
   (b) about 10 parts by weight of an impact improving amount of a core-shell resin having a rubbery core surrounded by a grafted acrylic shell; and
   (c) a combination comprising about 20 parts by weight of reinforcing mica and about 20 parts by weight of reinforcing glass.

8. A composition as defined in claim 7 wherein said core shell resin comprises a rubbery core of polymerized acrylate monomer and an outer shell of polymerized acrylate monomer.

9. A composition as defined in claim 7 wherein said core shell resin comprises a rubbery core of polymerized diene monomer and an outer shell of polymerized acrylate monomer.

10. A composition as defined in claim 1 which also includes a small, effective amount of a flame retardant agent.

* * * * *